(12) United States Patent
Jiang et al.

(10) Patent No.: US 7,081,177 B2
(45) Date of Patent: Jul. 25, 2006

(54) APPARATUS AND PROCESS FOR TRANSFERRING A COATING ONTO A SURFACE OF A LENS BLANK

(75) Inventors: Peiqi Jiang, Palm Harbor, FL (US); Fadi O. Adileh, Tampa, FL (US); Yassin Yusef Turshani, Largo, FL (US)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 121 days.

(21) Appl. No.: 10/437,272

(22) Filed: May 13, 2003

(65) Prior Publication Data

US 2004/0008317 A1 Jan. 15, 2004

Related U.S. Application Data

(63) Continuation of application No. 09/899,367, filed on Jul. 2, 2001, now Pat. No. 6,562,466.

(51) Int. Cl.
*B32B 31/16* (2006.01)
(52) U.S. Cl. .............. 156/74; 156/74.99; 156/228; 156/275.5; 351/257.7; 351/41; 351/44; 428/411; 428/412
(58) Field of Classification Search .............. 156/74, 156/99, 228, 275.5, 275.7; 351/41, 44; 428/411, 428/412
See application file for complete search history.

(56) References Cited

U.S. PATENT DOCUMENTS

| | | | |
|---|---|---|---|
| 4,927,480 A * | 5/1990 | Vaughan | 156/228 |
| 6,355,124 B1 * | 3/2002 | Blomberg et al. | 156/99 |
| 6,562,466 B1 * | 5/2003 | Jiang et al. | 428/412 |

* cited by examiner

*Primary Examiner*—Terressa Boykin
(74) *Attorney, Agent, or Firm*—Fulbright & Jaworski L.L.P.

(57) ABSTRACT

The present invention relates to an improved process or method for transferring a coating onto at least one surface of a lens blank which can be implemented in a short period of time without any risk of deformation of the lens blank.

17 Claims, 2 Drawing Sheets

APPARATUS AND PROCESS FOR TRANSFERRING A COATING ONTO A SURFACE OF A LENS BLANK

This application is a continuation of application Ser. No. 09/899,367 filed Jul. 2, 2001, now U.S. Pat. No. 6,562,466 the entire contents of which is incorporated herein by reference.

BACKGROUND OF THE INVENTION

The present invention relates to an improved process or method for transferring a coating onto at least one surface of a lens blank which can be implemented in a short period of time without any risk of deformation of the lens blank.

It is a common practice in the art to coat at least one face of an ophthalmic lens with several coatings for imparting to the finished lens additional or improved optical or mechanical properties.

Thus, it is usual practice to coat at least one face of an ophthalmic lens, typically made of an organic glass material, with successively, starting from the face of the lens, an impact resistant coating (impact resistant primer), a scratch resistant coating (hard coat), an anti-reflecting coating and, optionally, a hydrophobic top coat. Other coatings such as polarized coating, photochromic or dying coating may also be applied onto one or both faces of the ophthalmic lens.

Numerous processes and methods have been proposed for coating a face of an ophthalmic lens.

U.S. Pat. No. 4,061,518 discloses a process for fabricating an article having a replicated coating with a durable dielectric overcoat thereon which comprises forming onto an optically polished surface of a master a release layer, a protective coat and a reflective coat, applying a pre-measured amount of an epoxy resin adhesive on a face of a support member of casting, and thereafter transferring the coating from the master to the support member of casting by applying the coating face of the master to the epoxy resin adhesive, curing the epoxy resin adhesive under heat and withdrawing the master. The support member of casting is preferably an aluminium casting. The described method is particularly suited for making mirrors.

WO 99/24243 discloses a method of making a thermoplastic lens by placing a laminated layer/coating having the desired lens characteristics required for the prescription between a preheated lens blank and preheated mold halves and pressing the mold halves toward each other to compress the lens blank and uniformly apply the layer/coating thereon without any creases or cracks therein.

In this method, the lens molds are pressed toward each other and against the lens blank to immediately size down the lens blank and any laminations included therewith to its finished lens size with the desired layer coatings in few minutes. In fact, the lens blank and juxtaposed laminations are compressed at a predetermined programmed rate of speed, whereby the lens blank is compressed and spread out into the mold cavity with a layer/coating uniformly applied thereon.

In order to obtain the required geometry for the final lens, spreading of the blank must be carefully controlled and therefore heating and compression have also to be carefully controlled.

U.S. Pat. No. 5,512,371 discloses a composite plastic optical quality lens, comprising a plastic lens preform of optical quality material, and a cured plastic attached portion that is bonded to said plastic lens preform portion; said cured plastic attached portion having higher scratch resistance, and lower chromatic aberration than said plastic lens preform.

Such a lens is obtained by pouring a lens composition in a molding cavity delimited by a mold part and a lens preform and then curing said lens composition.

According to one preferred embodiment of U.S. Pat. No. 5,512,371, coatings may be provided on the resultant lens by transferring coatings from the mold to the resultant lens.

The purpose of U.S. Pat. No. 5,512,371 is to substantially modify and improve the mechanical properties of the plastic lens preform, generally made of bisphenol A polycarbonate. In particular, properties such as edging and chromatic aberration of the whole resultant lens are supposed to be significantly modified by the cured attached portion. Such results are achievable only for cured attached portions having a thickness globally in the same range or even higher than the thickness of the preform, taking into account that the usual center thickness of the final resultant lens is generally, as known in the art, of more than 1 mm.

If it was not the case, the modifications brought by the cured portion would have no significant effects on the properties of the composite lens such as chromatic aberration and edging.

WO 93/21010 also relating to the manufacture of composite lenses gives a minimum thickness for the preform.: 100 microns, with typical thickness of 0.5 to 1.5 mm.

In general, it is difficult to manufacture and handle preforms that are less than 500 microns thickness.

Based on the above elements, it is clear that thicknesses for the cured attached portion of U.S. Pat. No. 5,512,371, even if not specifically mentioned, are typically around 0.5 mm or above.

According to the method of manufacture described in U.S. Pat. No. 5,512,371, a resin is poured in a mold and a lens polycarbonate preform is placed on the top of the resin filled mold, slight pressure is applied to squeeze out excess resin until a carrier of sufficient thickness is obtained.

The assembly lens preform/mold part is held together with the capillary action of the resin material and the weight of the lens preform.

SUMMARY OF THE INVENTION

It is an object of the invention to provide a process or a method for transferring a coating from a support onto at least one surface of a lens blank which does not entail any deformation of the lens blank.

It is an additional object of this invention to provide a process or a method for transferring a coating from a support onto at least one surface of a lens blank which further does not necessitate the use of specific mold parts for each prescribed final lens geometry.

In accordance with the above objects and those that will be mentioned and will become apparent below, the process or method for transferring a coating from at least one mold part onto at least a geometrically defined surface of a lens blank comprises:

providing a lens blank having at least one geometrically defined surface;

providing a support having an internal surface bearing a coating and an external surface;

depositing on said geometrically defined surface of said lens blank or on said coating a premeasured amount of a curable glue;

moving relatively to each other the lens blank and the support to either bring the coating into contact with curable glue or bring the curable glue into contact with the geometrically defined surface of the lens blank;

applying a sufficient pressure onto the external surface of the support so that the thickness of a final glue layer after curing is less than 100 micrometers;

curing the glue; and withdrawing the support to recover the lens blank with the coating adhered onto the geometrically defined surface of said lens blank.

In one embodiment of the process of the invention, the pre-measured amount of the curable glue may consist in the external layer of the coating itself, in particular an impact-resistant primer layer of the coating to be transferred. This could be the case when the impact-resistant primer layer comprises UV polymerizable (meth)acrylate monomers. It can also be the anti-abrasion layer, in particular when no primer layer is to be transferred to the blank.

It also can be the external layer of an anti-reflective coating, in particular when only such an anti-reflective coating is being transferred. In that case, of course, the anti-reflective coating is deposited in a liquid form.

In an other embodiment of the inventive process an adhesive primer layer may be deposited on the blank, prior to the deposition of the pre-measured amount of the curable glue.

Of course, the pre-measured amount of curable glue can be deposited in any appropriate form such as in the form of a drop or of a layer.

By geometrically defined surface of the lens blank or of a mold part, there is meant either an optical surface, that is a surface of required geometry and smoothness or a surface having a required geometry but that may still exhibit some roughness, such as a lens blank that has been grinded and fined, but not polished to the required geometry. The surface roughness typically ranges from Sq $10^{-3}$ µm to 1 µm, preferably from $10^{-3}$ to 0.5 µm and most preferably from $10^{-3}$ to 0.1 µm.

By optical surface, there is meant a surface of the lens blank or of a mold part that has been grinded, fined and polished or molded to required geometry and smoothness.

An important feature of the process of the present invention is that the transfer of the coating onto the geometrically defined surface of the lens blank is performed without any substantial compression of the blank and thus without any risk of deformation of the blank geometry and in particular of the geometrically defined surfaces thereof.

Nevertheless, the pressure exerted on the external surface of the support is preferably substantially maintained at least up to the gelling of the glue. Maintaining the pressure can be effected through the use of an inflatable membrane placed on the external surface of the support.

Preferably, the applied pressure ranges from 5 to 20 Psi (0.3 to 3 kgf/cm$^2$).

Using the above described process, coatings may be transferred successively or simultaneously to both front and rear geometrically defined surfaces of the lens blank.

The coating support may simply be a thin supporting film made of an appropriate material such as a plastic material, for example a polycarbonate film. The coating support is preferably a mold part made of any appropriate material, preferably made of a plastic material and in particular of polycarbonate.

The mold part may be rigid or flexible, but is preferably flexible. Using rigid mold parts necessitates to have a large number of mold parts each comprising an geometrically defined surface whose geometry is adapted to a specific geometry of the geometrically defined surface of a lens blank. In order to avoid the necessity of having such a huge number of different mold parts, the mold part is preferably a flexible mold part, in particular a flexible mold part made of a plastic material such as polycarbonate. When using this flexible mold part it is only necessary to provide the mold part with a surface the geometry of which conforms to the general shape of the optical surface of the lens blanks onto which the coating is to be transferred, either a concave or convex shape, but it is not necessary that this surface strictly corresponds to the geometry of the lens blank surface to be coated. Thus, the same mold part can be used for transferring coatings onto lens blanks having surfaces of different specific geometries. Flexible mold parts would typically have a thickness of 0.3 to 5 mm. Preferably, the flexible mold part is made of polycarbonate, and in this case the thickness is from 0.5 to 1 mm.

Preferably, when moving relatively to each other the mold part and the blank, the contact between coating(s) and curable glue or between curable glue and lens blank geometrically defined surface occurs respectively in the center area of the coated mold part or in the center area of the lens blank geometrically defined surface.

In particular in the case of a flexible convex mold part, this convex mold part may have a shorter radius of curvature than the concave surface of the blank to be coated. Thus, pressure is applied at the center and the mold part is then deformed to conform to the blank surface. The glue layer is formed starting from the center of the blank, which avoids entrapping air bubbles whithin the final cured glue layer. The same will be true using a concave mold part of longer radius of curvature than a convex blank surface to be coated.

The lens blank can be a lens having one or both of its faces surfaced to the required geometry. (A lens having only one of its faces surfaced to the required geometry is called a semi-finished lend).

Preferably, the lens blank has a first face conferring progressive power and a second face conferring non-progressive power, but of spherical or torical shape onto which coating transfer according to the invention process is preferably performed. Preferably, the progressive face is the front face of the blank.

The lens blank can also be a semi-finished lens wherein one face of the lens, preferably the front face of the lens has previously been treated with an appropriate coating (anti-reflective, hard coat, etc. . . . ) and the remaining face, preferably the rear face, of the lens is coated using the transfer process of the invention.

The lens blank can be pre-treated before applying the method of the invention.

The pretreatment can be physical or chemical such as a solvent treatment or a NaOH treatment.

The transferred coating may comprise any coating layer or stack of coating layers classically used in the optical field, such as an anti-reflective coating layer, an anti-abrasion coating layer, an impact resistant coating layer, a polarized coating layer, a photochromic coating layer, an optical-electronical coating, an electric-photochromic coating, a dying coating layer, or a stack of two or more of these coating layers.

Typically, the total thickness of the coating to be transferred is less than 50 µm, preferably less than 20 micrometers, or even better 10 µm or less.

The glue or adhesive may be any curable glue, preferentially a thermally curable of photocurable glue or adhesive that will promote adhesion of the coating to the optical surface of the blank without impairing the optical properties of the finished lens.

The curable glue or adhesive can be polyurethane compounds, epoxy compounds, (meth)acrylate compounds such as polyethyleneglycol di(meth)acrylate, ethoxylated bisphenol A di(meth)acrylates.

Preferably, when cured, the glue layer has an even thickness. A glue from the Loctite Company is also recommended and isobornylacrylate.

As previously mentioned, the thickness of the final glue layer after curing is less than 100 µm, preferably less than 80 µm, most preferably less than 50 µm and usually 1 to 30 µm.

The lens blank may be made of any material suitable for making optical lenses but is preferably made of a plastic material and in particular of diethyleneglycol bis-allylcarbonate copolymer (CR-39® from PPG INDUSTRIES) or polycarbonate (PC).

The final lenses obtained by the method of the invention have very good optical quality and they have no or very low level of interference fringes.

BRIEF DESCRIPTION OF THE DRAWING

The foregoing and other objects, features and advantages of the present invention will become readily apparent to those skilled in the art from a reading of the detailed description hereafter when considered in conjunction with the accompanying drawings wherein.

DETAILED DESCRIPTION OF THE PREFERRED EMBODIMENT

Although the following description makes reference to the use of the preferred flexible mold part, it shall be understood that the described process can also be implemented using rigid mold parts.

Figure 1A:
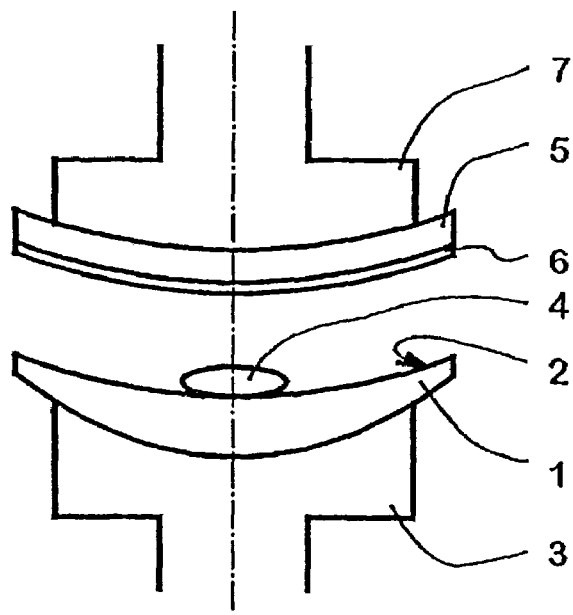
FIGS. 1A to 1C are schematic views of the main steps of a first embodiment of the process of the invention for transferring a coating onto an optical surface of a lens blank.
Figure 1B:
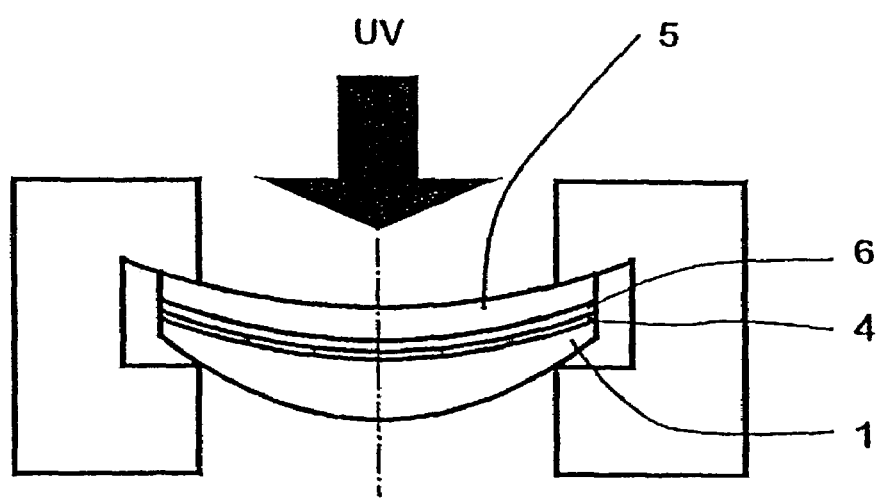
Figure 1C:
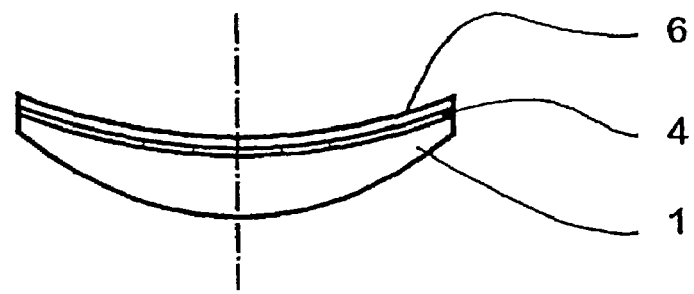

Referring now to the drawings and in particular to FIGS. 1A to 1C, a lens blank 1 having a concave surface 2 is placed on a supporting element 3 with its concave surface 2 facing upwardly. A premeasured drop of a UV curable glue 4 is then deposited onto the surface 2 of the lens blank 1. A flexible mould part 5 having a convex optical surface, which has been previously coated with a prescribed coating 6, is placed onto a supporting element 7 with its surface bearing the optical coating facing down wardly.

Deposition of coating 6 on the surface of the flexible mold part 5 can be done through any usual deposition process employed in the optical field, such as vacuum deposition, spin coating, brush coating, dip coating etc... Of course, the deposition process will depend on the nature of the coating layer or layers deposited on the surface of the flexible mold part 5.

Thereafter the supporting elements 3, 7 are moved relatively to each other to bring into contact coating 6 and UV curable glue drop 4 and a pressure is exerted to the external surface of the mold part opposite to the coating in such a manner that the UV curable glue drop will spread on the surface 2 of the lens blank 1 and on the coating 6. However, the exerted pressure shall only be sufficient for spreading the drop of glue in order to obtain the required thickness for the final cured glue film but insufficient to impart any deformation to the lens blank 1.

As shown in FIG. 1B, the assembly formed by the lens blank 1, the glue film 4, the coating 6 and the mold part 5 is then placed into a device for UV curing the glue film 4. After curing of the UV film 4, the mold part 5 is withdrawn and a blank 1 having a coating 6 adhered onto its concave surface 2 is recovered as shown in FIG. 1C.

Figure 2A:
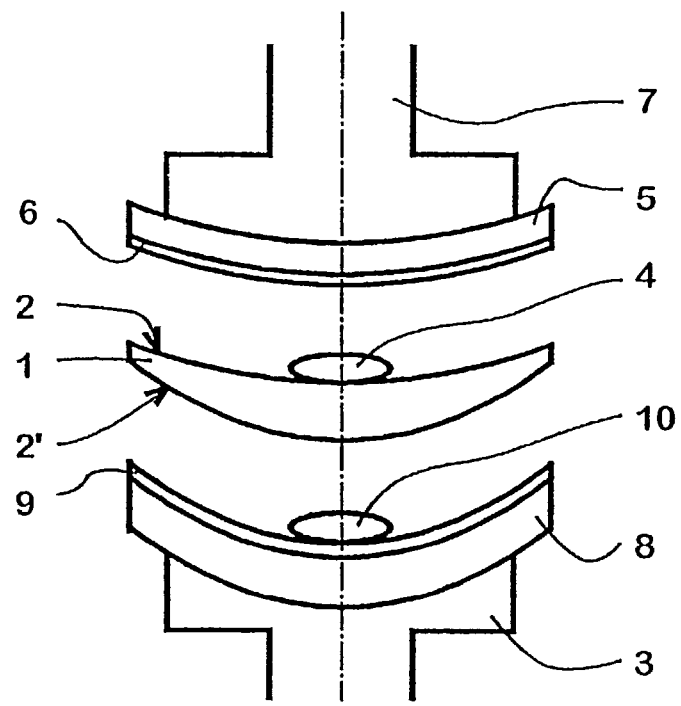
FIGS. 2A to 2C are schematic views of the main steps of a second embodiment of the process of the invention wherein coatings are simultaneously transferred to both optical surfaces of a lens blank.
Figure 2B:
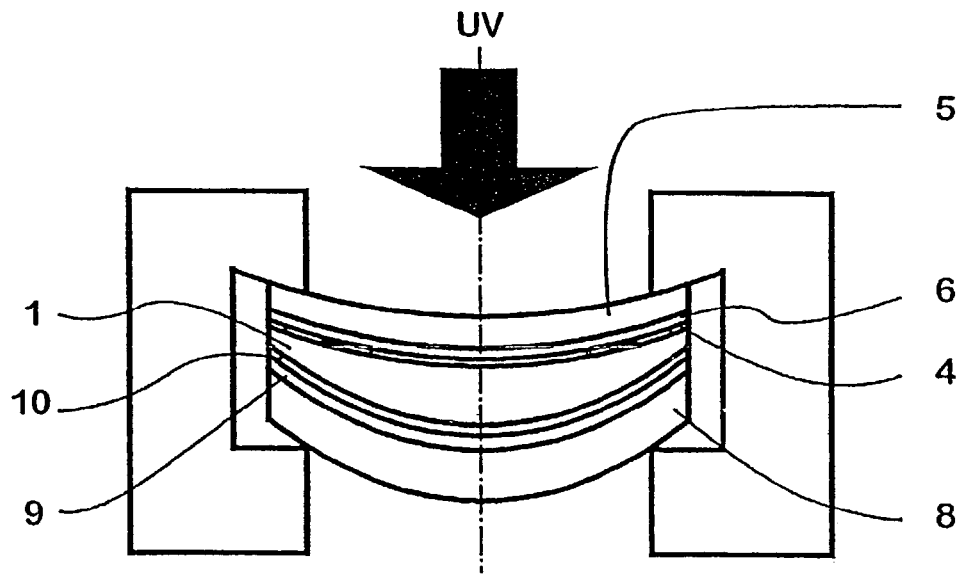
Figure 2C:
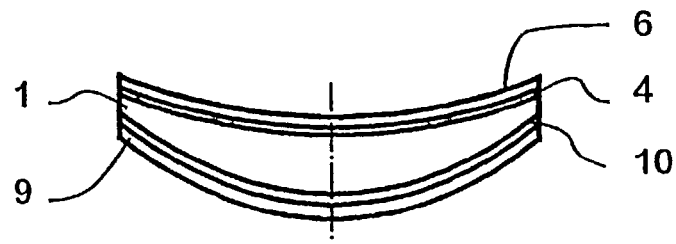

Referring now to FIGS. 2A to 2C, there is shown a similar process as described in connection with FIGS. 1A to 1B but in which both surfaces of lens blank 1 are coated with a coating by the transfer method of the invention.

As shown in FIG. 2A, a flexible mould part 8, for example a mould part made of polycarbonate having a thickness of 1 mm, whose concave surface has been previously coated with an optical coating 9 is placed onto a supporting element 3. A premeasured drop 10 of a UV curable glue is then deposited onto coating 9. A lens blank 1 is then placed on mold part 8 with its convex surface 2' in contact with glue drop 10. A premeasured UV curable glue drop is then deposited on concave surface 2 of lens blank 1. A flexible mold part 5, for example a polycarbonate mold part of 1 mm thickness, whose convex surface has been previously coated with an optical coating 6 is placed on a supporting element 7. Supporting elements 3, 7 are then moved relatively to each other to bring coating 6 into contact with glue drop 4 and a pressure is exerted on at least the external surface of one of the mold part to spread the glue drops 4 and 10 to form glue films. As indicated previously, the pressure exerted must only be sufficient to spread the glue drops and form glue films of required thicknesses after curing but insufficient to create any deformation in the lens blank 1.

Thereafter, the assembly formed by the mold parts, optical coatings, glue films and lens blank is placed into a UV curing device where the glue films 4, 10 are UV cured.

After completion of curing of the glue films, mold parts 5 and 8 are withdrawn and a finished lens having optical coatings 5, 6 adhered to both surfaces of the lens blank 1 is recovered, as shown in FIG. 2C.

The following examples illustrate the process of the present invention.

EXAMPLE 1

The convex side with base curve 6 of a flexible mold part made of polycarbonate (PC) and having a thickness of 1 mm is pre-coated with HMC coating. Orma SF[(1)] lenses were surfaced on their back side to different curves of surface as indicated in Table I below. Then the HMC coating on the mold part was transferred to the surface back side of the lenses in the manner described in connection with FIGS. 1A to 1C. The glue used was a UV curable glue OP-21 from DYMAX Inc. After the curing, the mold part was removed from the lenses and the lenses were recovered with the coating stuck on their back sides. The finished coated lenses have very good optical properties and the transfer coatings show no cracks even though the coatings were deformed to a certain level during the transfer.

(1) SF: semi-finished

TABLE I

| Coating PC mold part | Orma lens with different back curve | Coating transfer results |
|---|---|---|
| Spheric CV 6 Base | 5 base with toric 0.9 | Excellent |
| Spheric CV 6 Base | 5 base with toric 0.2 | Excellent |
| Spheric CV 6 Base | 6 base with toric 0.9 | Excellent |
| Spheric CV 6 Base | 6 base with toric 2.0 | Excellent |

EXAMPLE 2

Example 1 was reproduced but using a soft silicone mold part instead of a PC mold part. The resulting final coated lenses exhibited very good optical properties and the coatings do not show any cracks even though the coatings were deformed to a certain level during the transfer.

The silicone mold part used was made from POR-A-MOLD 2030 of Synair Inc. The silicone monomer was filled into a glass mold and cured at room temperature for 24 hours to get a front 4 base curve carrier with thickness of 2.5 mm. The obtained silicon has 900% elongation and 28 of Shore A Hardness.

EXAMPLE 3

Orma SF lenses were grinded to different levels on their back side with 6 base curves and coatings were transferred to the back side of the lenses as disclosed in example 1. After transfer of the coating, the finished coated lenses were checked by transmission, Haze with Haze-Gard Plus (BYK Gardner) (compared to the sample before transfer of the coating). Then, the lens were checked again in Arc lamp to see if there was any grinding lines seen by the eye. Grinding process and results are given in Table II below:

(1) V95+fine=standard grinding process before polishing
(2) A new grinding process developed by Gerber Coburn Inc.

V-95+fine W: V95 is a computer controlled generate machine from LOH company and fine W is another fining machine (Toro-X-2SL) from LOH company (in current process, the SF lens need to be generated by V-95 and then be fined by Toro-X-2SL and go to polishing process to get a Rx lens, so here we save the polishing process).

The Gemini process is the new smoothing generating and fining machine developed by Gerber Coburn Inc. for polycarbonate lenses. This process can achieve better smoothing than Toro-X-2SL of LOH's fining machine. By using the Gemini smoothing machine, the Rx lens could be coated to save polishing.

EXAMPLE 4

Example 3 was reproduced except that polycarbonate SF lenses were used instead of the Orma® SF lenses. Grinding process and results are given in Table 2.

EXAMPLE 5

A PC piano lens and an anti-reflective (AR) pre-coated PC mold with the same curve as the lens were fixed as the above scheme and a small amount of UV curable glue was put in between the PC lens and the mold with the AR film and then pressed/clipped to get uniform glue layer between the PC lens and the coated mould. The glue used was a polyurethane (meth)acrylate oligomer mixture with photoinitiator from DYMAX CORPORATION (OP-4-20628). The index of the glue is 1.477. Then, it was cured by a Fusion UV conveyor (9 mmH Bulb, 692 mW/cm2 in 350 nm, Fusion UV Systems, Inc) for about 1 minute. After that, the two joined parts with the glue were edged and separated to get the PC lens

TABLE II

HMC film transferred onto grind surface of the lens (without polishing)

| Lens type | Grind process type | T% (before) | Haze (before) | Roughness before transferring the coating(s) (Sq) | Refractive index of glue | T % (after) | Haze (after) | Seen in Arc lamp |
|---|---|---|---|---|---|---|---|---|
| Orma ® | V95 + fine w/ standard process[1] | 90 | 90 | 0.4 µm | 1.505 | 98 | 0.73 | Nothing |
| PC | Gemini process[2] | 91 | 3.5 | 0.03 µm | 1.505 | 95 | 0.42 | Nothing |

Sq: Quadratic mean of the deviations from the mean $$S_q = \sqrt{\frac{1}{NM} \sum_{x=1}^{N} \sum_{y=1}^{M} Z_{xy}^2}$$

Computes the efficient value for the amplitudes of the surfaces (RMS). This parameter is included in the EUR 15178 EN report.

The roughness (Sq) was measured by P-10 Long Scan of KLA-Tencor.

The measurement condition was under 2 µm tip 1 mg force 10 scans 500 µm long 2000 data points.

with an AR film layer transferred from the mold. The AR film on the PC lens was checked by Arc Lamp and showed all the AR film was perfectly transferred from the mold to the lens. The reflectance of the obtained PC lens with the AR layer is under 0.5% in 550 nm. There was no fringes seen under the lamp between the AR film and the PC lens.

EXAMPLE 6

Same as Example 5, except a −2.00 polythiourethane lens (Thin & Lite® lens with index of 1.60) was used with the same glue and same process. The obtained lens has the same AR properties as Example 5.

EXAMPLE 7

A PC plano lens and an AR/hardcoating & primer films (HMC) pre-coated plastic mold with the same curve as the lens were fixed as the above scheme and a small amount of UV curable glue was put in between the PC lens and the mold with the AR film and then pressed/clipped to get uniform glue layer adhered to the PC lens and the coated mold. The glue used was a polyurethane (meth)acrylate oligomer mixture with photoinitiator from DYMAX CORPORATION (OP-4-20628). The index of the glue is 1.477. Then, it was cured by a Fusion UV conveyor (9 mmH Buld, 692 mW/cm2 in 350 nm, Fusion UV Systems, Inc) for about 1 minute After that, the two joined parts with the glue were separated to get the PC lens with an AR film layer transferred from the plastic mold. The AR film on the PC lens was checked by an Arc Lamp and showed all the AR film was perfectly transferred from the mold to the lens. The reflectance of the obtained PC lens with the AR layer is under 0.5% in 550 nm. No fringes seen under the lamp between the AR film and the PC lens.

EXAMPLE 8

A −2.00 Thin & Lite® uncoated lens (ne=1.60) was fixed by a pair of HMC pre-coated plastic mold which have the same curve base as the lens, and then it was glued and cured as above to get a HMC coated high index lens. The obtained HMC lens has no fringes and the reflectance is under 1.0%.

EXAMPLE 9

A −4.25 ultra-high index lens substrate based on episulfide (ne=1.74) was fixed with HMC pre-coated plastic mold same as done for Example 3. The obtained HMC lens has no fringes and the reflectivity is under 0.5%. The adhesion test by cross hatch showed 100% adhesion. Thickness of the different layers was measured by microscopy, where the thickness of the glue is about 20 μm and the hard-coat layers are about 4–5 μm and AR layers are <1 μm.

EXAMPLE 10

Same as Example 7, except using another glue (OP-21 from Dymax Corp.). The results were the same as in Example 7.

HMC pre-coating of the mold parts of the above examples was as follows, except in example 5 wherein no hard coat and no primer coat is used.

Step 1: Protecting Coating

The composition of the protecting coating was as follows:

| Component | Parts by weight |
| --- | --- |
| PETA LQ (acrylic ester of pentaerythritol) | 5.00 |
| Dowanol PnP | 5.00 |
| Dowanol PM | 5.00 |
| n-propanol | 5.00 |
| 1360 (Silicone Hexa-acrylate, Radcure) | 0.10 |
| Coat-O-Sil 3503 (reactive flow additive) | 0.06 |
| Photoinitiator | 0.20 |

The PC mold parts are cleaned using soap water and dried with compressed air. The mold part convex surfaces are then coated with the above protecting coating composition via spin coating with application speed of 600 rpm for 3 seconds and dry speed of 1200 rpm for 6 seconds. The coating was cured using Fusion System H+ bulb at a rate of 1.524 m/minute (5 feet per minute).

Step 2: Anti-Reflective (AR) Coating

The PC mold parts after deposition of the protecting coating was vaccum coated as follows:

A/ Standard Vacuum AR Treatment: The Vacuum AR treatment is accomplished in a standard box coater using well known vacuum evaporation practices. The following is one procedure for obtaining the VAR on the mold:

1. The molds having the protective coating already applied on the surface, are loaded into a standard box coater and the chamber is pumped to a high vacuum level.
2. Hydrophobic coating (Chemical=Shin Etsu KP801M) is deposited onto the surface of the molds using a thermal evaporation technique, to a thickness in the range of 2–15 nm.
3. The dielectric multilayer AR coating, consisting of a stack of sublayers of high and low index materials is then deposited, in reverse of the normal order. Details of this deposition are as such:

The optical thicknesses of the alternating low and high index layers are presented in the table:

| Low index | 103–162 nm |
| --- | --- |
| High index | 124–190 nm |
| Low index | 19–37 nm |
| High index | 37–74 nm |

B/ At the completion of the deposition of the four-layer anti-reflection stack, a thin layer of SiO2, comprising of a physical thickness of 1–50 nm, is deposited. This layer is to promote adhesion between the oxide anti-reflection stack and a laquer hard-coating which will be deposited on the coated mold at a later time.

Step 3: Hard Coat (HC) & Latex Primer Coating

The composition of the hardcoating was as follows:

| Component | Parts by weight |
| --- | --- |
| Glymo | 21.42 |
| 0.1 N HCl | 4.89 |
| Colloidal silica | 30.50 |
| Methanol | 29.90 |
| Diacetone alcohol | 3.24 |
| Aluminium acetylacetonate | 0.45 |
| Coupling agent | 9.00 |
| Surfactant FC-430 (3M company) | 0.60 |

The composition of the primer was as follows:

| Component | Parts by weight |
| --- | --- |
| Polyurethane latex W-234 | 35.0 |
| Deionized water | 50.0 |
| 2-Butoxy ethanol | 15.0 |
| Coupling agent | 5.00 |

The PC mold parts after deposition of protecting coating and AR coating in Steps 1 and 2 are then spin coated by HC solution at 600 rpm/1200 rpm, and precured 10 minutes at 80° C., and again spin coated by latex primer solution at the same speed and postcuring for 1 hour at 80° C.

The coupling agent is a precondensed solution of:

| Component | Parts by weight |
|---|---|
| GLYMO (Glycidoxypropyltrimethoxysilane) | 10 |
| Acryloxypropyltriméthoxysilane | 10 |
| 0.1 N HCl | 0.5 |
| Aluminium acetylacetonate | 0.5 |
| Diacetone alcohol | 1.0 |

The invention claimed is:

1. A process for transferring a coating onto at least one geometrically defined surface of a lens blank which comprises:
    providing a lens blank having at least one geometrically defined surface;
    providing a mold part comprising a coating support having an internal surface bearing a coating and a premeasured amount of a curable glue deposited on said coating;
    moving relatively to each other the lens blank and the support to either bring the coating into contact with the curable glue or bring the glue into contact with the geometrically defined surface of the lens blank;
    applying a sufficient pressure onto the external surface of the support so that the thickness of a final glue layer after curing is less than 100 μm;
    curing the glue; and
    withdrawing the mold part to recover the lens blank with the coating adhered onto the geometrically defined surface thereof.

2. The process of claim 1, wherein the coating comprises an anti-reflective coating layer, an anti-abrasion coating layer, an impact resistant coating layer, a polarized coating layer, a photochromic coating layer, a dying coating layer, or a stack of two or more of these coating layers.

3. The process of claim 2, wherein the coating has a thickness of 50 μm or less.

4. The process of claim 1, wherein the mold part is further defined as a rigid mold part having an internal surface corresponding to the geometrically defined surface of the lens blank.

5. The process of claim 4, wherein the mold part is further defined as made of a plastic material.

6. The process of claim 4, wherein the mold part is further defined as made of polycarbonate.

7. The process of claim 1, wherein the mold part is further defined as a flexible mold part having an internal surface conformable to the geometrically defined surface of the lens blank when brought into contact therewith.

8. The process of claim 7, wherein the mold part is further defined as made of plastic material.

9. The process of claim 7, wherein the mold part is further defined as made of polycarbonate.

10. The process of claim 7, wherein the mold part has a thickness of 0.3 to 1 mm.

11. The process of claim 1, wherein the mold part is further defined as adapted to transfer the coating to a geometrically defined surface of a lens blank.

12. The process of claim 11, wherein the geometrically defined surface of the lens blank is an optical surface.

13. The process of claim 11, wherein the geometrically defined surface of the lens blank has a roughness Sq ranging from $10^{-3}$ to 2 μm.

14. The process of claim 1, wherein the premeasured amount of a curable glue is adapted to result in a final cured glue layer of less than 80 μm during use.

15. The process of claim 14, wherein the premeasured amount of a curable glue is adapted to result in a final cured glue layer of less than 50 μm during use.

16. The process of claim 15, wherein the premeasured amount of a curable glue is adapted to result in a final cured glue layer of between 1 and 30 μm during use.

17. The process of claim 1, wherein the mold part is adapted to perform under an exerted pressure range of from 5 to 30 PSI during use.

* * * * *